United States Patent
Wu

(10) Patent No.: US 7,308,682 B2
(45) Date of Patent: Dec. 11, 2007

(54) METHOD AND APPARATUS FOR RECOVERING DATA VALUES IN DYNAMIC RUNTIME SYSTEMS

(75) Inventor: Youfeng Wu, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 702 days.

(21) Appl. No.: 10/424,007

(22) Filed: Apr. 25, 2003

(65) Prior Publication Data

US 2004/0216095 A1    Oct. 28, 2004

(51) Int. Cl.
*G06F 9/44* (2006.01)

(52) U.S. Cl. .................................... 717/151

(58) Field of Classification Search ........ 717/151–159, 717/139–141; 712/216, 218, 23
See application file for complete search history.

(56) References Cited

U.S. PATENT DOCUMENTS

| | | | |
|---|---|---|---|
| 5,850,553 A * | 12/1998 | Schlansker et al. | 717/155 |
| 5,889,999 A * | 3/1999 | Breternitz et al. | 717/158 |
| 6,247,172 B1 * | 6/2001 | Dunn et al. | 717/141 |
| 6,301,705 B1 * | 10/2001 | Doshi et al. | 717/154 |
| 6,463,582 B1 * | 10/2002 | Lethin et al. | 717/158 |
| 6,487,716 B1 * | 11/2002 | Choi et al. | 717/159 |
| 6,651,247 B1 * | 11/2003 | Srinivasan | 717/161 |
| 2001/0013118 A1 * | 8/2001 | Krishnaswamy | 717/5 |
| 2002/0078436 A1 * | 6/2002 | Clarke | 717/155 |
| 2003/0023959 A1 * | 1/2003 | Park | 717/151 |
| 2003/0135722 A1 * | 7/2003 | Johnson | 712/235 |
| 2004/0019768 A1 * | 1/2004 | Ross et al. | 712/216 |

FOREIGN PATENT DOCUMENTS

| | | | |
|---|---|---|---|
| EP | 0703532 A | 3/1996 | |
| EP | 0844557 A | 5/1998 | |

OTHER PUBLICATIONS

D.M. dhamdhere et al., "Dynamic Currency Determination in Optimized Programs" 1998, pp. 1-20, ACM Press, New York, NY USA.*
PCT Search Report and Written Opinion dated Nov. 7, 2005.
Thomas Ball et al., "Efficient Path Profiling," IEEE, 1996, pp. 46-57.
D.M. Dhamdhere et al., "Dynamic Currency Determination in Optimized Programs," 1998, pp. 1-20, ACM Press, New York, NY, USA.

* cited by examiner

*Primary Examiner*—Wei Zhen
*Assistant Examiner*—Anna Deng
(74) *Attorney, Agent, or Firm*—Guojun Zhou

(57) ABSTRACT

An arrangement is provided for data value recovery in an optimized program by precisely allocating predicate registers to guard branching instructions in the optimized program at compilation time. At execution time, an execution path leading to a recovery point is determined based on values of predicate registers guarding branching blocks. The values of non-current and non-resident data may be recovered at the recovery point according to the determined execution path. Optimization annotations may also be utilized for data value recovery.

26 Claims, 13 Drawing Sheets

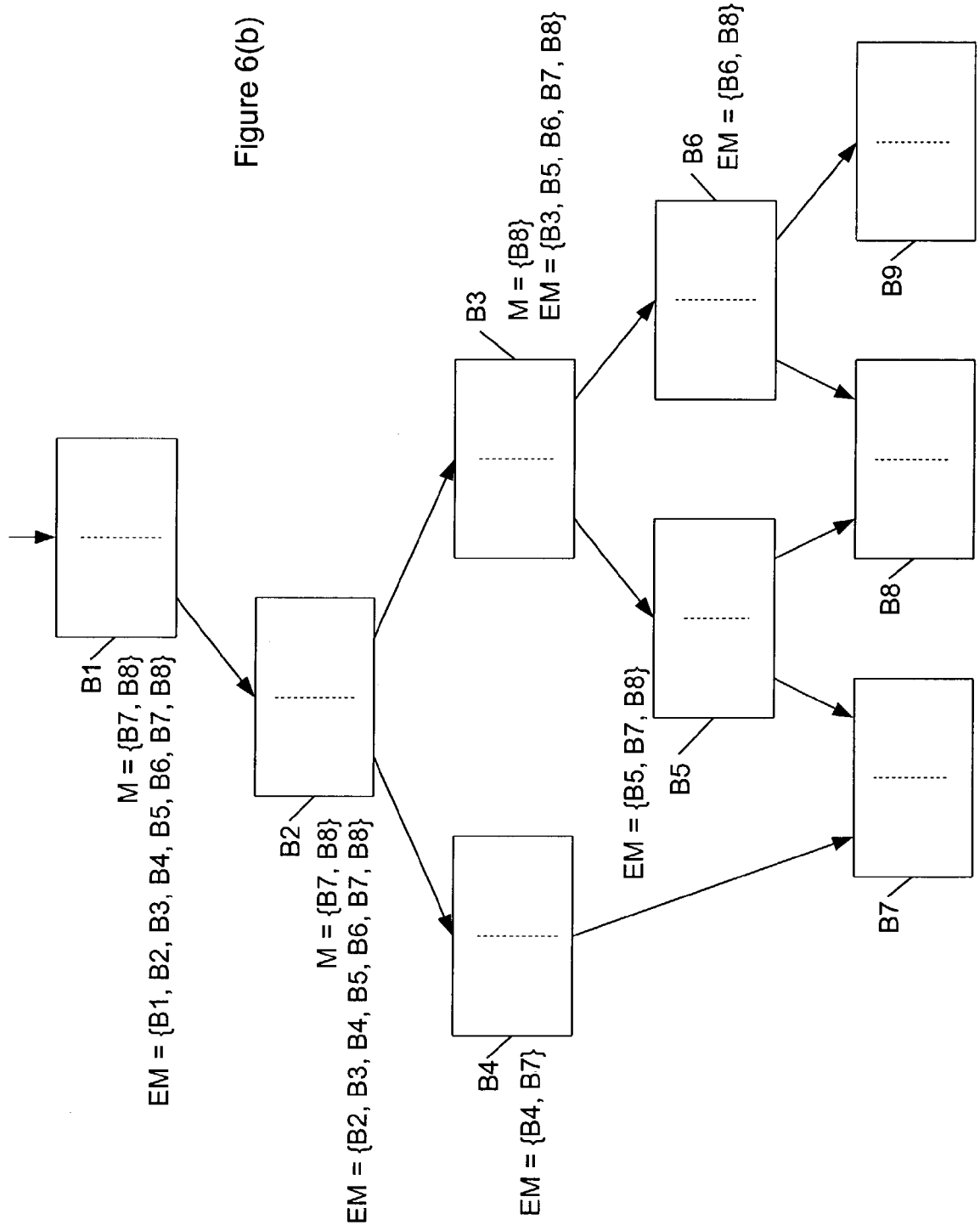

```
/* All Ms start with being empty */
705: m_reached = { }
710: For each block B in reverse topological order
715:     if B has no success
720:         B->R = {B}
725:     else if B has one successor S inside region
730:         B->M = S->M
735:         B->R = S->R
     else /* B has two successors S1 and S2 */
740:         B->R = S1->R ∪ S2->R
745:         mblocks = S1->R ∪ S2->R
750:         m_reached ∪= mblocks
755:         B->M = mblocks ∪ S1->M ∪ S2->M /* All EMs start with being empty */
760: For each block B in reverse topological order
765:     if B->EM is empty and B ∉ m_reached
770:         continue
775:     B->EM ∪= {B}
780:     For each predecessor block PB of B
785:         PB->EM ∪= B->EM
```

Figure 7

810: For each branching block B1 in the region such that M(B1) is not empty

820:     VP1 = the guarding predicate register of B1's conditional branch

830:     For each block B2 in B1->EM

840:         For each predicate register VPi used in B2

850:             add interference edge (VP1, VPi)

Figure 8

905: refined_set = {} /* initialize refined_set with an empty set */

910: For each exception point that require data value recovery

920:     identify the lead block LB for the exception point

930:     cover_set = blocks reachable from B and reaching exception point

940:     refined_set ∪= cover_set

950: Use the refined_set to identify branching blocks, compute m-reach relationships, and build interference graph

Figure 9

1105: K = number of predicate words to be saved

1110: If (rotation r[i+1] = r[i], i = K-1, ..., 1, can be independently performed)

1115:   Allocate K general registers: r[1], r[2], ..., r[K]

1120:   Independently perform rotation operation r[i+1] = r[i], i = K-1, ..., 1

1125:   Insert r[1] = current predicate word before loop branch is taken else

1130:   Allocate K rotating registers, r[1], r[2], ..., r[K]

1135:   Insert r[1] = current predicate word before loop branch is taken

1140:   Initialize rotating base and modify loop branch to rotate if the loop has not done so 1145: Insert "r[1] = INVALID STATE" in loop pre-header block before entering the loop

Figure 11

```
1205: B = the lead block for the exception block
1210: While ( (B) && (B != exception block) )
1215:     add B to execution path
1220:     if (B is not a branching block)
1225:         B = B's successor block in the region
1230:         continue
1235:     if (B does not m_reach the exception block)
1240:         B = B's successor block that reaches the exception block
1245:         continue
1250:     if (value of B's guarding predicate register == 1)
1255:         B = B's true successor in the region
1260:     else /* (value of B's guarding predicate register == 0) */
              B = B's false successor in the region
```

Figure 12

At compilation time:

1305: For each candidate region for optimizations

1310: Apply optimizations and make sure that data values at possible execution points are recoverable 1320: Generate a flow graph for the optimized region 1330: Identify exception points, lead blocks, and branching blocks 1340: Refine the flow graph for the optimized region 1350: Compute m_reach relationships between blocks 1360: Perform precise register allocation in a DAG region 1370: Insert predicate words save and rotation instructions for a loop region At execution time:

1380: Determine execution path

1390: Use path information and optimization annotations to recover data values

METHOD AND APPARATUS FOR RECOVERING DATA VALUES IN DYNAMIC RUNTIME SYSTEMS

BACKGROUND

1. Field

The present invention relates generally to compilers and debuggers and, more specifically, to data value recovery in dynamic runtime systems.

2. Description

Increasing the execution speed of a program has always been a goal of a dynamic runtime system (DRS) such as a dynamic binary translation system and a debugging system of optimized programs. To achieve this goal, a DRS usually employs aggressive optimization techniques, e.g., global optimizations, and reordering, insertion and deletion of instructions. These optimization techniques may move instructions around to achieve a higher execution speed. As a result, the execution order of instructions after optimizations may be different from the execution order of instructions before the optimizations. For example, instruction A is executed before instruction B before optimizations; but instruction A may be executed after instruction B after the optimizations. A different execution order resulting from the optimizations may cause problems in recovering originally expected data values (before optimizations) for some variables at certain exception points. In other words, the actual value of a variable might not be the originally expected value of the variable at an exception point. Such problems may be further complicated by branches in a program. The execution order may change due to optimizations for one side of a binary branch, but not for the other side. An exception point where data values of all variables can be correctly determined as originally expected is called precise exception. It is important to achieve precise exceptions so that bugs causing exceptions can be correctly identified. Precise exceptions can usually be achieved through the information of an execution path leading to the exception point at execution time. Similarly, it is also important to recover the expected values of data at each break point during a debugging process.

One solution to determine an execution path is to instrument each block (a set of codes) to dump a timestamp each time the block is executed as proposed by D. M. Dhamdhere and K. V. Sankaranarayanan in "Dynamic Currency Determination in Optimized Programs," published in Association for Computing Machinery (ACM) Transactions on Programming Languages and Systems, vol. 20, 1998, pages 1111-30. A program may be divided into blocks according to branch instructions. This solution, however, leads to a 10-20 percent slowdown of an optimized program. Another solution is to increment a register along a subset of the execution edges to encode the current execution path, as described by T. Ball and J. Larus in "Efficient Path Profiling," published in Proceedings of $29^{th}$ Annual IEEE/ACM International Symposium on Microarchitecture, 1996. However, this solution is for static path profiling and may slow down the optimized program by about 40 percent. Therefore, a new solution that does not incur much overhead and can dynamically profile the execution path to ensure data value recovery is desired.

BRIEF DESCRIPTION OF THE DRAWINGS

The features and advantages of the present invention will become apparent from the following detailed description of the present invention in which:

FIGS. 6(a)-(b) are schematic illustrations showing how sets of a block reaches, m-reaches, and em-reaches are computed for an optimized region of a program, according to an embodiment of the present invention;

FIG. 7 is an exemplary pseudo-code illustrating how reachability relationships between different code blocks are computed to achieve precise predicate register allocation, according to an embodiment of the present invention;

FIG. 8 is an exemplary illustration of using reachability information between different blocks to modify an interference graph of virtual predicate registers used for different blocks, according to an embodiment of the present invention;

FIG. 9 is an exemplary illustration of refining a program flow graph of an optimized region of a program for precise predicate register allocation, according to an embodiment of the present invention;

FIG. 11 is an exemplary pseudo-code illustrating how a number of register words may be used circularly to record an execution path of an optimized loop region in a program, according to an embodiment of the present invention;

FIG. 12 is an exemplary illustration of determining an execution path leading to an exception point for data value recovery at execution time, according to an embodiment of the present invention; and FIG. 13 is an exemplary illustration of a process in which data values are prepared to be recovered during compilation time and are actually recovered during execution time according to an embodiment of the present invention.

DETAILED DESCRIPTION

An embodiment of the present invention is a method and apparatus for enabling data value recovery at exception/break points in a dynamic runtime system (DRS) such as a dynamic binary translation system and a debugging system of optimized programs. The present invention may be used to dynamically profile an execution path of an optimized program at runtime without significantly slowdown of the execution speed of the optimized program. A precise predicate register allocation technique may be used to ensure that an execution path is determinable for a program with branches. To precisely allocate predicate registers, the program may be represented as a number of code blocks based on branching instructions. A block that has more than one successor block is called a branching block. Branching blocks may be subsequently identified and a region involved with optimizations and branching blocks may be trimmed for further processing. Relationships among different blocks may be further computed for the region and used for the precise predicate register allocation purpose. These relationships may be represented by the information of how one block reaches others. Based on the relationships among different blocks, the interference graph may be generated and augmented for the region. The interference graph may be relied upon to allocate predicate registers to different branching blocks precisely. When an exception occurs during execution or at a break point during debugging, an execution path leading to the exception/break point may be determined based on values of predicate registers that are precisely allocated to branching blocks. Consequently, values of non-current and non-resident data may be recovered based on the determined execution path along with optimization annotations.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Figure 1:
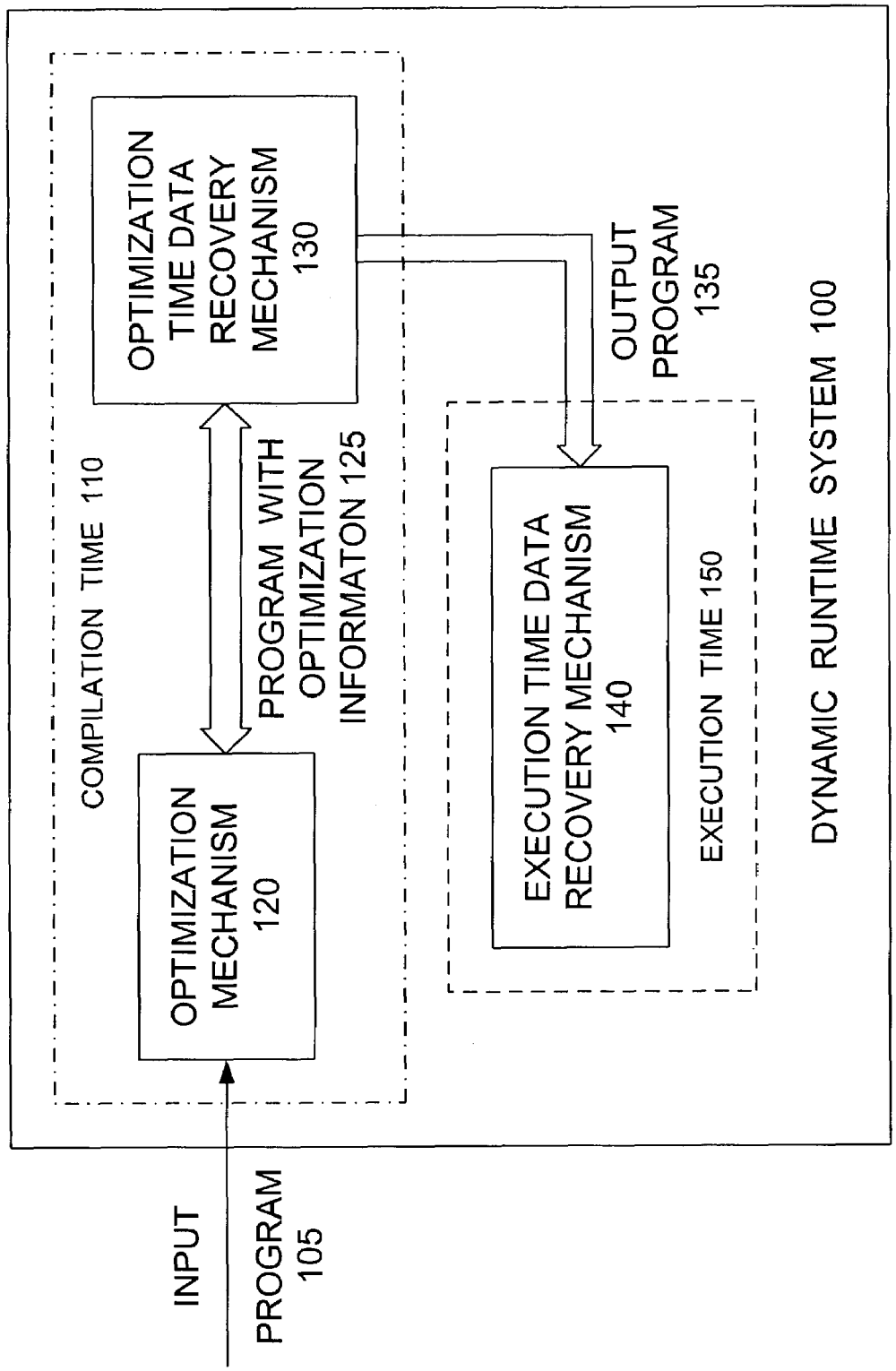
FIG. 1 depicts a high-level framework of an example dynamic runtime system using data recovery mechanisms, according to an embodiment of the present invention.

FIG. 1 depicts a high-level framework of an example dynamic runtime system using data recovery mechanisms, according to an embodiment of the present invention. A dynamic runtime system comprises components that can be roughly classified into two categories, that is, compilation time components 110 and execution time components 150. The compilation time components comprise two components: optimization mechanism 120 and optimization time data recovery mechanism 130. The optimization mechanism accepts an input program 105 and performs optimizations (e.g., instruction reordering, insertion, and deletion, etc.) for the program. Also the optimization mechanism may comprise an optimization annotation component to annotate the performed optimizations. The optimization annotations record what the optimization mechanism does to the input program, e.g., information on where an instruction is moved. The optimization annotations may be helpful for data value recovery at exception/break points. The optimization mechanism passes the program with optimization information 125 to the optimization time data recovery mechanism. Note that the optimization time data recovery mechanism works together with the optimization mechanism during optimizations. The optimization time data recovery mechanism uses the optimization information to record data flow through precise predicate register allocation. The output program 135 from the optimization time components contains necessary information such as values and predicate registers allocated to branching blocks to recover data values at exception/break points during execution time.

The execution time components 150 of the dynamic runtime system comprise an execution time data recovery mechanism 140. The execution time data recovery mechanism accepts the output program 135 from the optimization time components. Based on values of predicate registers, the execution time data recovery mechanism may determine an execution path leading to an exception/break point. The execution time data recovery mechanism may further use the determined execution path as well as information contained in the optimization annotations to recover expected values of data at the exception/break point.

Figure 2B:
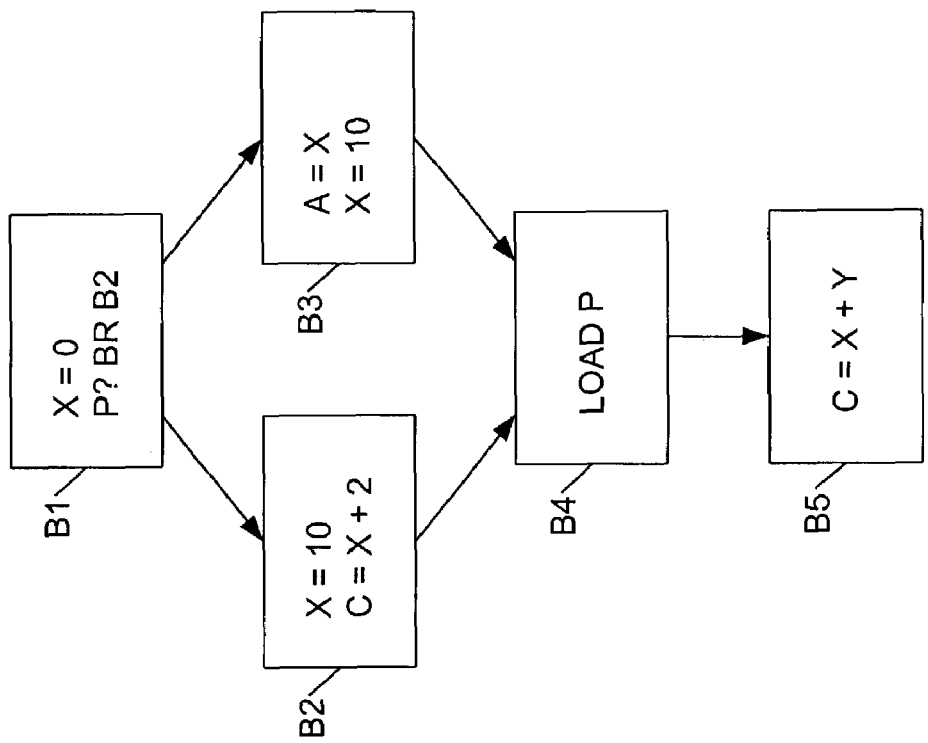
FIGS. 2(a)-(b) are schematic illustrations showing how a predicate register may help recover the expected value of a variable that is affected by an optimization.
Figure 2A:
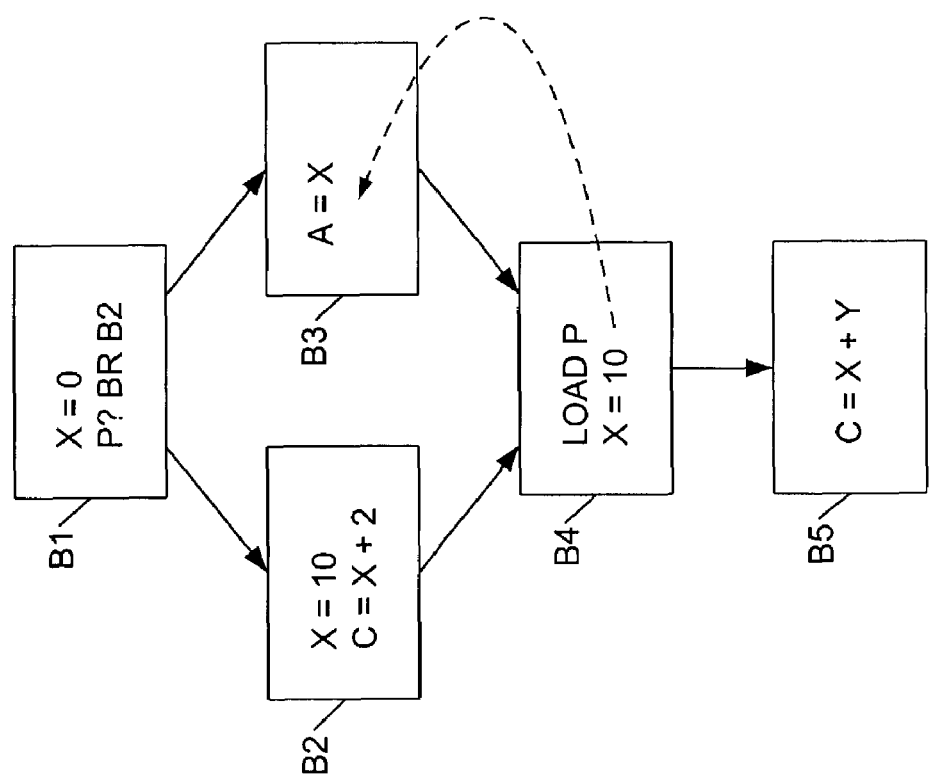

FIGS. 2(a)-(b) are schematic illustrations showing how a predicate register may help recover the expected value of a variable that is affected by an optimization. FIG. 2(a) represents a block flow diagram of a program before optimization. There are five blocks (B1-5) in the program, of which B1 is a two-way branching block. B1 has two successor blocks, B2 and B3. The value of a predicate register P decides which successor block will be executed following B1. The predicate register P can have only two values: 1 or 0. If the value of the predicate register P is 1, B2 is executed following B1; otherwise, B3 is executed following B1. X is a variable in the program whose value changes in B1, B2 and B4. If an execution path is B1→B2→B4, an instruction (X=10) in B4 will repeat the same instruction in B2. Typically, an optimization method may be used to move the instruction (X=10) in B4 to B3 as shown in FIG. 2(b). Such an optimization may improve execution speed if the execution path B1→B2→B4 is most frequently taken. Additionally, the optimization will not affect the final result of variable X whichever path is taken, if no exception occurs before B5.

If an exception occurs at the instruction, LOAD P, in B4 of the optimized program, however, the expected value of X will be different for two possible execution paths (the actual value of X will be the same (=10) for two possible paths). If the path B1→B2→B4 is taken, both the actual value and the expected value of X will be 10 at the exception point and there is no need to recover the expected value for X. If the path B1→B3→B4 is taken, the actual value of X will be 10, but the expected value of X will be 0 at the exception point. It is thus necessary to recover the expected value for X at the exception point when the path B1→B3→B4 is taken. Therefore, a predicate register P may be used to help determine the execution path to recover the expected value of variable X. With the value of the predicate register P along with optimization annotation information, the expected value of X can be recovered at the exception point if the path B1→B3→B4 is taken. Similarly, if a debugging system of the optimized program breaks at the instruction, LOAD P, in B4, the debugging system can recover the expected value of X with the same information, that is, the value of the predicate register P and the optimization annotations.

Figure 3:
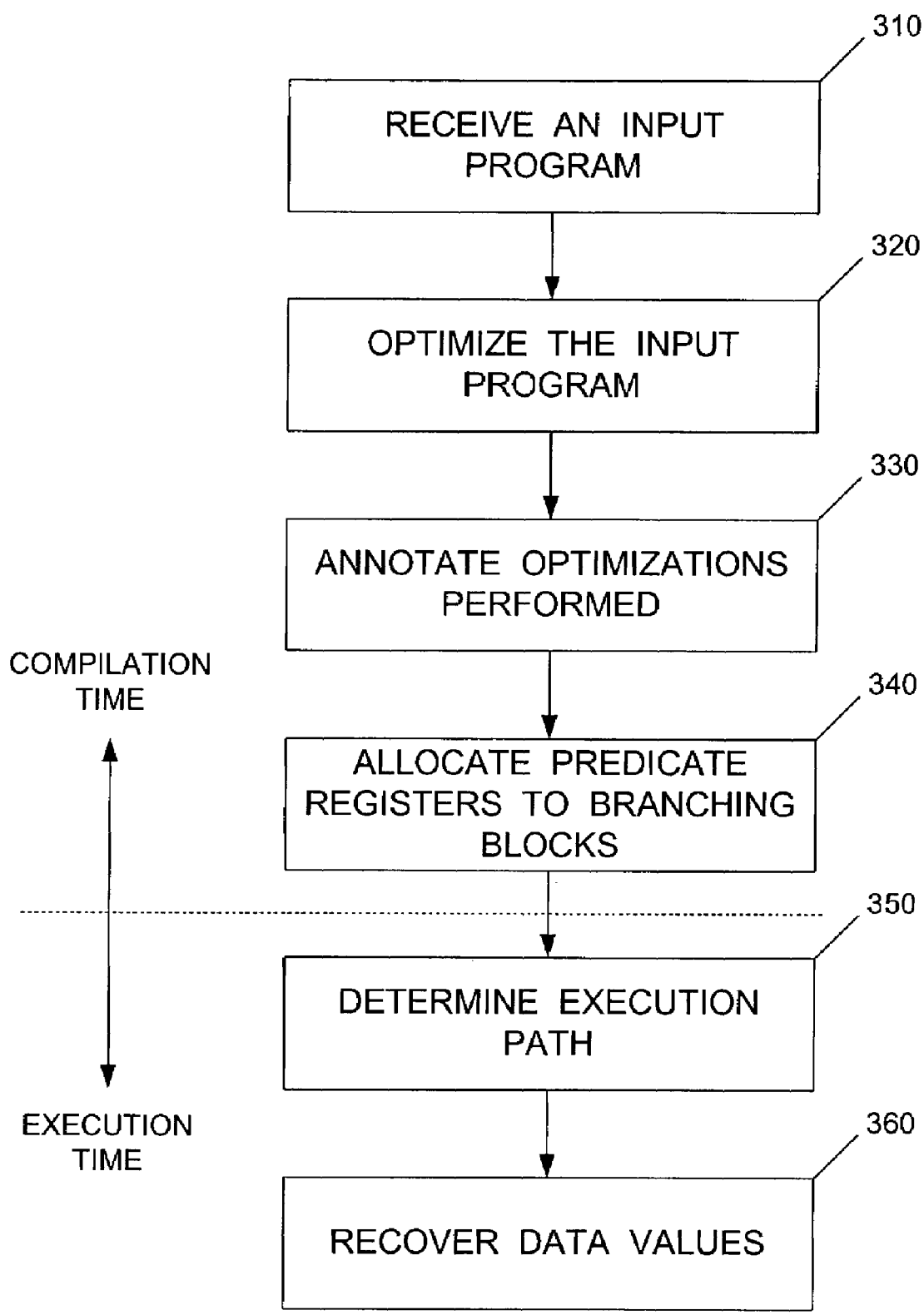
FIG. 3 is an exemplary flow diagram of a process in which a data value recovery method is performed in a dynamic runtime system, according to an embodiment of the present invention.

FIG. 3 is an exemplary flow diagram of a process in which a data value recovery method is performed in a dynamic runtime system, according to an embodiment of the present invention. An input program may be received at step 310. The input program may be optimized at step 320. Optimizations applied at step 320 may include reordering, deletion, or insertion of instructions. At step 330, the optimizations performed at step 320 are annotated. The annotations may record positions of an instruction before and after the optimizations. Such annotations may be used for data value recovery at exception/break points. At step 340, predicate registers are allocated to branching blocks so that an execution path of the optimized program can be precisely recorded. Steps 310-340 are performed during the compilation time. Steps 320, 330, and 340 may be performed simultaneously or in an order different as shown in FIG. 3 to achieve similar results. Based on predicate register values, the execution path of the optimized program may be determined at step 350. At step 360, expected data values may be recovered based on the determined execution path as well as optimization annotations of the optimized program.

Figure 4:
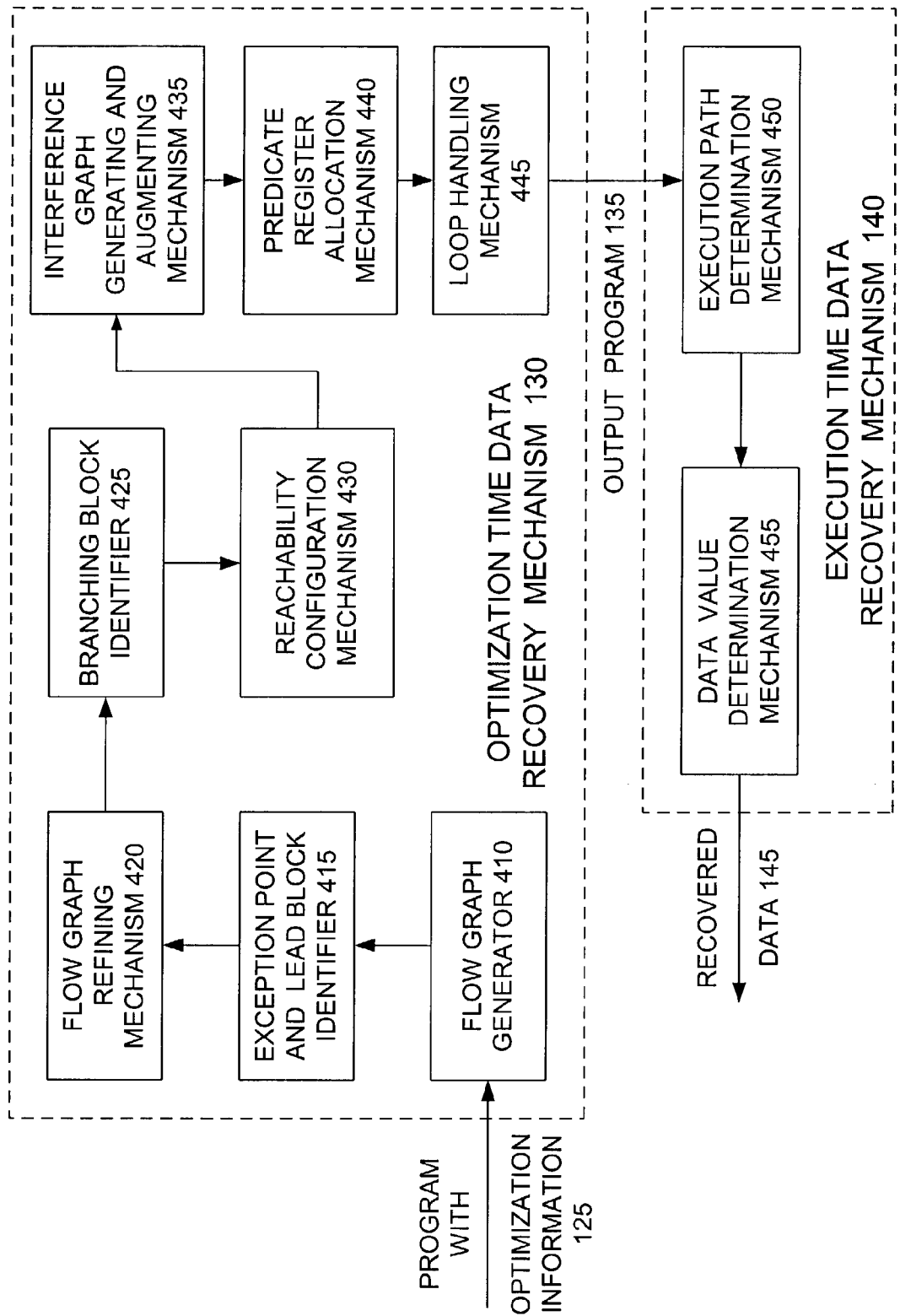
FIG. 4 is a high-level functional block diagram of an optimization time data recovery mechanism and an execution time data recovery mechanism, according to an embodiment of the present invention.

FIG. 4 is a high-level functional block diagram of an optimization time data recovery mechanism and an execution time data recovery mechanism, according to an embodiment of the present invention. For convenience, the following specification only describes the data value recovery at exception points. Note that the same methods and systems can be easily used or extended to the data value recovery at break points in a debugging system. The optimization time data recovery mechanism comprises eight major components: flow graph generator 410, exception point and lead block identifier 415, flow graph refining mechanism 420, branching block identifier 425, reachability configuration mechanism 430, interference graph generating and augmenting mechanism 435, predicate register allocation mechanism 440, and loop handling mechanism 445.

The flow graph generator 410 (as shown in FIG. 4) accepts a program with optimization information 125 from the optimization mechanism 120 (as shown in FIG. 1). The flow graph generator analyzes the structure of the program and generates an initial flow graph of the program. Each initial flow graph may be generated for each optimized region of the program. It is not necessary to recover data values in a region of the program that is not optimized. Based on an initial flow graph of an optimized region generated by the flow graph generator, the exception point and lead block identifier 415 identifies exception points for the optimized region, assuming that only exception points require data value recovery. Each identified exception point may define a lead block that dominates all the blocks required for the data value recovery for an exception point. The exception point and lead block identifier also identifies a lead block for each exception point.

After identifying the exception points and lead blocks for the optimized region, the flow graph refining mechanism 420 (as shown in FIG. 4) refines the initial flow graph of the optimized region generated by the flow graph generator 410. The flow graph refining mechanism trims the initial flow graph to include only a region necessary for data value recovery. The region contains the identified exception points and lead blocks that are critical for determining an execution path leading to an exception point where data value recovery is needed. The process of refining the initial flow graph of the optimized region is illustrated in FIG. 9, which will be described later. After the optimized region is refined, the branching block identifier 425 identifies branching blocks in the optimized region.

To determine the execution path, it is necessary to record precisely which successor path is taken following each branching block. A predicate register is usually used to guard a branch instruction in computing architectures such as Intel Corporation's Itanium™ architecture. A block's branch condition being TRUE (or FALSE) means that the value of the branch instruction's guarding predicate register is 1 (or 0). If each branching block uses a unique predicate register to guard its branch instruction and the predicate register is live (not reused) to the exception point, the execution path can be determined by examining values of predicate registers of all branching blocks before the exception point. Therefore, a predicate register for a branching block may be not reused because the reuse of the predicate register may cause the execution path information related to the branching block carried by the predicate register to be overwritten before reaching the exception point. Typically, a virtual predicate register is first assigned to a branching block and the virtual predicate register is later mapped to a physical predicate register by a predicate register allocation algorithm. Since the number of physical predicate registers is limited, a predicate register allocation algorithm may try to reuse a physical predicate register whenever possible. A predicate register allocation with which the execution path cannot be uniquely determined from the values in physical predicate registers is referred to as an ambiguous predicate register allocation; otherwise the predicate register allocation is referred to as a precise predicate register allocation.

Figure 5B:
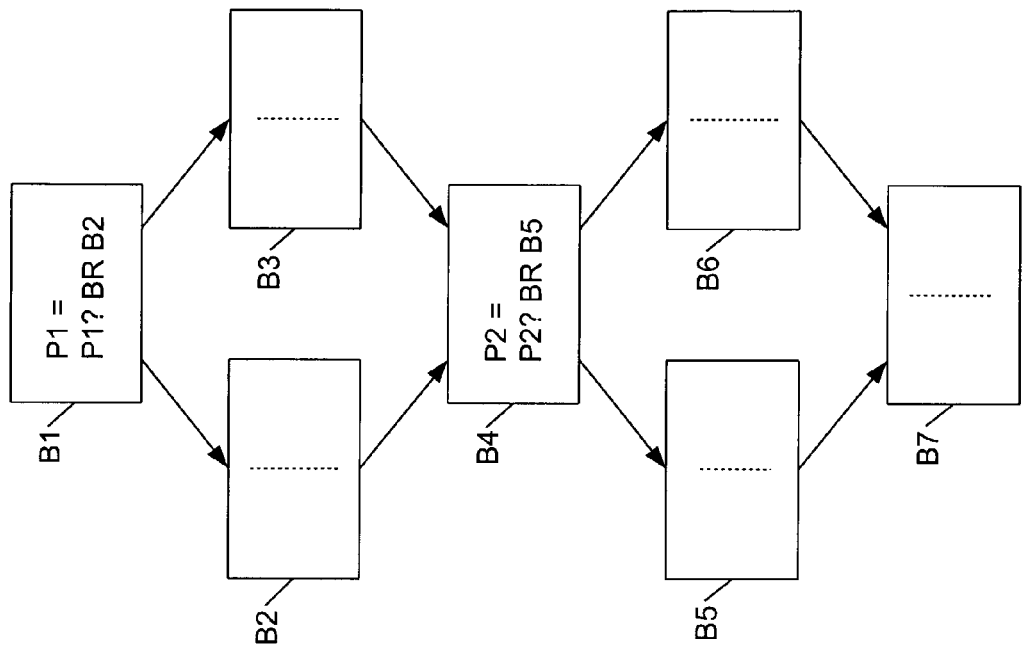
FIGS. 5(a)-(b) are schematic illustrations of different impacts of ambiguous and precise predicate register allocations on data value recovery.
Figure 5A:
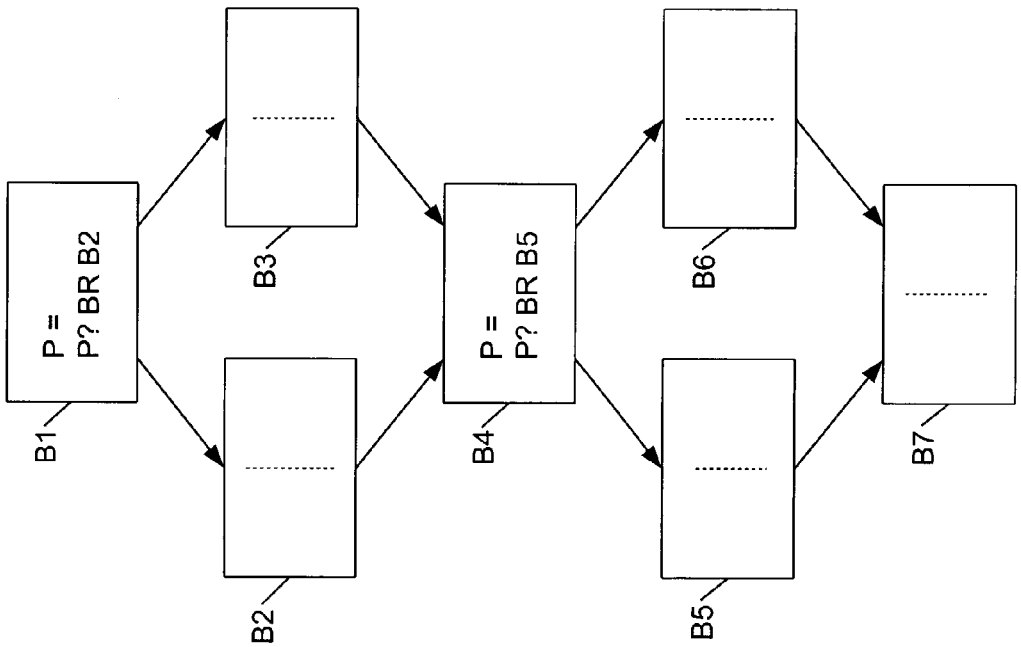

FIGS. 5(a)-(b) are schematic illustrations of different impacts of ambiguous and precise predicate register allocations on data value recovery. FIG. 5(a) shows an example of an ambiguous predicate register allocation where a predicate register allocation algorithm allocates the same physical predicate register P to both branching blocks B1 and B4. In this example, the execution path information from B1 to B4 carried in the predicate register P is lost when the execution reaches B7. In other words, it is impossible to determine which one (B2 or B3) is executed following B1 based on the value of the predicate register P. FIG. 5(b) shows an example of a precise predicate register allocation where a predicate register allocation algorithm allocates two different predicate registers P1 and P2 to two branching blocks B1 and B4, respectively. In this example, all four possible execution paths up to B7 (i.e., B1→B2→B4→B5→B7, B1→B2→B4→B6→B7, B1→B3→B4→B5→B7, and B1→B3→B4→B6→B7) can be uniquely determined based on four possible value combinations of predicate registers P1 and P2.

One method to achieve precise predicate register allocation is to allocate a unique physical predicate register to each branching block and make sure all allocated physical predicate registers are live to all potential exception points. This method is trivially precise. However, this method may unnecessarily use more physical predicate registers than are available. This method may also cause more register spills and reloads that may slow down program execution. Therefore, a more sophisticated precise predicate register allocation algorithm is desired. The present invention discloses a method that uses multi-reachability (m-reach) relationships between blocks in an optimized region of a program to determine precisely which virtual predicate registers may be mapped to different physical predicate registers. For convenience purposes, the following description uses two-way branching blocks as examples and focuses on an optimized region that has a single entry block. Note that a person of ordinary skill in the art may extend the present invention to situations where there are multi-way blocks and/or multi-entry optimized regions.

To start describing how to compute the m-reach relationships between blocks, a direct acyclic graphic (DAG) region of a flow graph of a program is considered first. A DAG region is a region that does not have any loops. Additionally, a two-way branching block is considered a branching block only if both successors of the block are inside a region where the m-reach relationships are computed. If one successor of the block is outside the region, the execution path to an exception point must have followed the successor inside the region to an exception point. Thus, it is not necessary to have a unique physical predicate register for such a block.

A block A m-reaches another block B if and only if there is more than one possible execution path from A to B. For example, block B1 m-reaches block B4 and B7, and block B4 m-reaches block B7 in FIG. 5(a); but block B2 does not m-reach block B4, B5, or B6. In a tree region where the entry block reaches every block inside the region, there is no block m-reached by any other blocks because there is at most one execution path from one block to any other block. If a branching block C does not m-reach a branching block D, the same physical predicate register may be used to guard both blocks C and D even if block C reaches block D. This is because block C can reach block D along only one execution path and thus it is not necessary to retain the value of a physical predicate register for block C. In other words, the physical predicate register for block C may be reused by other blocks, such as block D. Therefore, in a tree region, there is no need for a precise predicate register allocation algorithm. On the other hand, if block C m-reaches block D, the same physical predicate register for both blocks may not lead to a precise execution path determination at a point after block D. For example, in FIG. 5(b), if block B1 and B4 use the same physical predicate register P, it is not possible to determine a precise execution path at any exception point in block B5, B6, or B7.

To achieve a precise predicate register allocation, an extended-multi-reach (em-reach) set for each block whose m-reach set is not empty has to be identified. An em-reach set for a block A includes all blocks that are on a path from A to one of A's m-reached blocks, including A's m-reached blocks. If a block A m-reaches block B, block A needs a physical register that is different from all physical predicate registers used for blocks in A's em-reach set to keep A's predicate register live all the way to block B. For a block A, the sets of blocks A reaches, m-reaches, and em-reaches may be represented as R(A), M(A), and EM(A), respectively. The R(A), M(A), and EM(A) may be computed by traversing a DAG region twice in a reverse topological order. In the first traversal, R(A) and M(A) may be computed as follows:

$$R(A) = \{A\} \cup \bigcup_{S \in succ(A)} R(S)$$

$$M(A) = \begin{cases} \{\}, & A \text{ is a leaf block} \\ \bigcup_{S \in succ(A)} M(S) \cup \left( \bigcup_{\substack{S_1, S_2 \in succ(A) \\ S_1 \neq S_2}} (R(S_1) \cap R(S_2)) \right), & \text{otherwise} \end{cases}$$

where succ(A) is a set of successor blocks of block A;

$$\left( \bigcup_{\substack{S_1, S_2 \in succ(A) \\ S_1 \neq S_2}} (R(S_1) \cap R(S_2)) \right)$$

represents blocks that appear in more than one R(S), and is equivalent to R(S1) ∩ (S2) when block A has only two successors, S1 and S2.

Figure 6A:
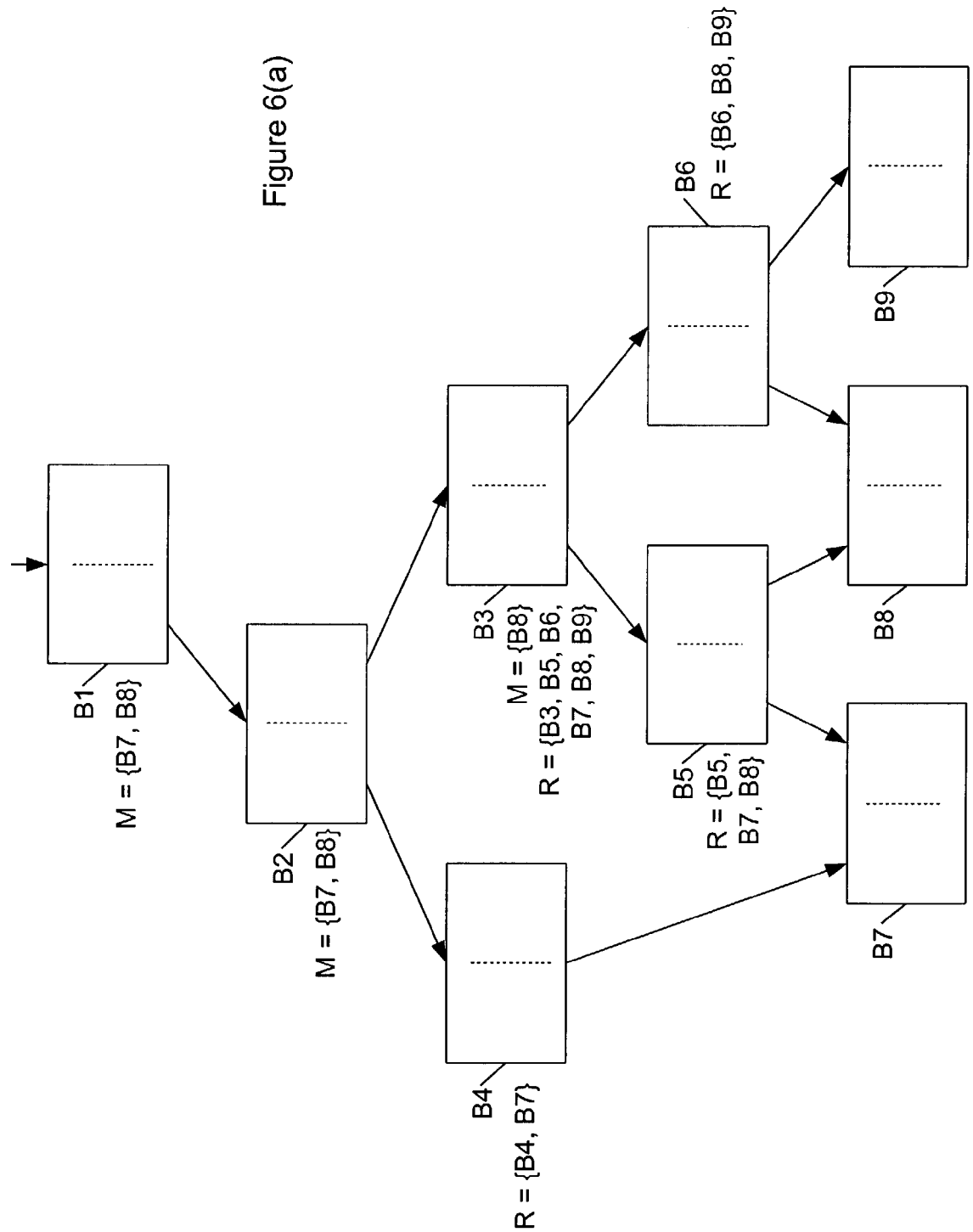

FIG. 6(a) is a schematic illustration showing how sets that a block reaches and m-reaches are computed for an optimized region of a program using the above equations. For example, since block B5 reaches B7 and B8 and block B6 reaches B8 and B9, R(B5)={B5,B7,B8}, R(B6)={B6,B8,B9}, and both M(B5) and M(B6) are empty. Thus, based on the above equations, R(B3)={B3,B5,B6,B7,B8,B9}, and M(B3)={B8}.

In the second traversal, a set of blocks that a block em-reaches are computed based on reach and m-reach sets of blocks in a flow graph. FIG. 6(b) is a schematic illustration showing how a set that a block em-reaches is computed based on reach and m-reach sets of blocks in an optimized region of a program. The computation of em-reach sets starts with blocks m-reached by other blocks in a reversal topological order. Whenever a block is traversed, the block is added to its own em-reach set. Using FIG. 6(b) as an example, the em-reach sets of blocks B7 and B8 are computed first: EM(B7)={B7}, EM(B8)={B8}. When block B5 is processed, the em-reach set of B5 is:

EM(B5)={B5} ∪ M(B7) ∪ M(B8)={B5,B7,B8}.

Similarly,

EM(B3)={B3} ∪ M(B5) ∪ M(B6)={B3,B5,B6,B7,B8}.

Note that B9 is not in EM(B3) because B9 is not in any path between B3 and blocks B3 m-reaches, which are B7 and B8.

FIG. 7 is an exemplary pseudo-code illustrating how reachability relationships between different code blocks may be computed to achieve precise predicate register allocation, according to an embodiment of the present invention. FIG. 7 is also an implementation illustration of how reach, m-reach, and em-reach sets are computed, as described above, for blocks in an optimized region of a program. Steps 705 to 755 show how reach and m-reach sets of each block are computed in the first traversal and steps 760 to 785 show how em-reach sets of relevant blocks are computed in the second traversal. Note that B→R, B→M, and B→EM represent reach, m-reach, and em-reach sets of a block B, respectively. Also note that FIG. 7 only considers two-way branching blocks and it is obvious for a person of ordinary skill in the art to extend the method to situations where multiple-way branching blocks exist.

Referring back to FIG. 4, the reachability configuration mechanism 430 computes reach, m-reach, and em-reach sets of blocks in a refined flow graph produced by the flow graph refining mechanism 420 for an optimized region of a program. The m-reach information computed by the reachability configuration mechanism may be further used to precisely allocate a limited number of physical registers to branching blocks in the refined flow graph.

The interference graph generating and augmenting mechanism 435 (as shown in FIG. 4) may comprise an initial interference graph generation component to generate an initial interference graph based on lifetimes of virtual predicate registers used in different blocks. A lifetime of a variable x is the time period through which the variable x is live. A variable x is live at a particular point (instruction or statement) in a program if x holds a value that may be needed in the future. Here a virtual predicate register may be considered as a normal variable for liveness analysis. Variables x and y do not interfere if they are not live during the same periods of a program; in other words, variable x interferes with variable y if the lifetime of x overlaps with the lifetime of y. An interference graph represents how lifetimes of different variables overlap with each other. If an overlap exists between lifetimes of variables x and y, there is an interference edge between x and y in the interference graph. Lifetime and interference graph are common concepts used in computer compiler systems.

The interference graph generating and augmenting mechanism 435 may also comprise an interference graph modification component to utilize the m-reach information of blocks in an optimized region of a program to augment the initial interference graph generated based on lifetimes of virtual predicate registers used in different blocks. In one embodiment, the m-reach information may be used to add additional interference edges to the initial interference graph. For example, assume that vp1 is a virtual predicate register guarding a conditional branch instruction in a branching block B1, and vp2, vp3, . . . , vpk are virtual predicate registers used in block B2 (whether B2 is a branching block or not). If block B1 em-reach block B2, new interference edges (vp1, vpi), I=2, . . . , k, may be added to the initial interference graph. An example implementation of adding additional interference edges to the initial interference graph based on the m-reach information of blocks in an optimized region of a program is illustrated in FIG. 8.

FIG. 9 is an exemplary illustration of refining a program flow graph of an optimized region of a program for precise predicate register allocation, according to an embodiment of the present invention. At step 905, a refined set of blocks for an optimized region of a program may be set empty. Step 910 starts an iterative process for each exception point identified by the exception point and lead block identifier 415 (as shown in FIG. 4). At step 920, a lead block may be identified for an exception point by the exception point and lead block identifier 415. At step 930, a cover set may be obtained that includes blocks reachable from the identified lead block and reaching the exception point. At step 940, the refined set is updated by merging the cover set into the refined set itself. At step 950, the refined set of blocks may be used by the flow graph refining mechanism 420 to refine an initial flow graph generated by the flow graph generator 410. Additionally, the refined set of blocks may be used for identifying branching blocks by the branching block identifier 425, computing m-reach relationships between blocks by the reachability configuration mechanism 430, and augmenting the initial interference graph by the interference graph generating and augmenting mechanism 435.

Referring back to FIG. 4 again, based on the augmented interference graph produced by the interference graph generating and augmenting mechanism 435, the predicate register allocation mechanism 440 may map physical predicate registers to virtual predicate registers in the augmented interference graph. In the mapping process, different physical registers are mapped to those virtual predicate registers in the augmented interference graph so that no two virtual predicate registers between which there is an interference edge may be mapped to the same physical predicate register. By so doing, precise physical predicate register allocation may be achieved.

Figure 10:
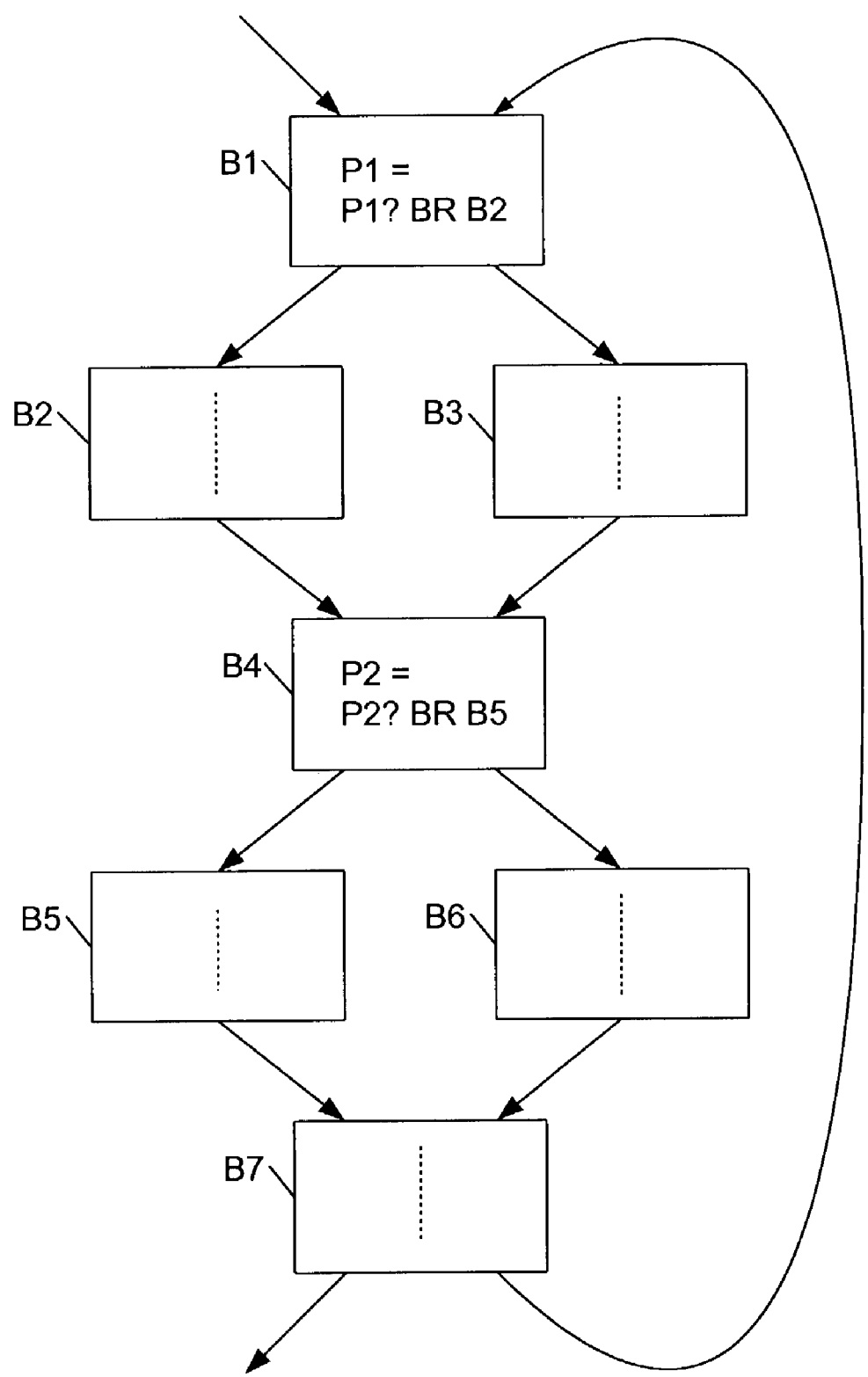
FIG. 10 is a schematic illustration of a program flow graph with a loop.

The above description only deals with a DAG region. When a loop exists in an optimized region of a program as illustrated in FIG. 10, the precise predicate register allocation method for a DAG region might not produce a precise physical predicate register for a loop region. An execution path for the loop region may contain a various number of iterations of a loop body. Assume that the loop body is a DAG region. The precise predicate register allocation method described above for a DAG region may be used to determine a precise execution path only if the execution path contains a single iteration of the loop body. When the execution path contains multiple iterations of the loop body, however, the physical predicate registers allocated for the loop body can only reflect part of the execution path for the most recent iteration of the loop body. Execution paths for earlier iterations of the loop body cannot be determined. In reality, the number of iterations of the loop body before an exception cannot be easily determined. Therefore, the precise predicate register allocation method for a DAG region cannot be used to precisely recover data values at exception points for a loop region.

To support precise data value recovery for a loop region, it is necessary to know predicate register values of earlier iterations. One method is to save values of predicate registers at the end of each execution of the loop body using a predicate word (e.g., a 64-bit word for 64 predicate registers). Based on an exception point and saved predicate words, a full execution path may be precisely determined. This method, however, does not work well for loops that iterate many times because the amount of storage needed for predicate words may be unbounded. 42P1 5786

In practice, many optimizations only move instructions across a limited number of loop iterations. For example, an instruction will be moved across a loop back edge no more than K iterations earlier in a software-pipelined loop with K stages. When an optimization moves an instruction only K iterations earlier, only the execution path history for up to K previous iterations may be related to data value recovery. Therefore, K registers, r[i], i=1, . . . , K, may be circularly used to save predicate words for K iterations of the loop body. In one embodiment, r[1] may be initialized with a special value indicating that r[1] is not a valid predicate word, before entering a loop. During the execution of the loop body, the K registers are rotated such that r[i+1]=r[i], i=k−1, . . . , 1. When the last block in a loop is executed, the current predicate word is moved into r[1]. Since rotation operations are independent of the loop execution, the rotation operations may be executed without incurring any overhead. The rotation operations may also be performed by hardware circuitry automatically, e.g. using rotating registers for loops that have not used up all the rotation registers.

FIG. 11 is an exemplary pseudo-code illustrating how a number of register words may be used circularly to record an execution path of an optimized loop region in a program, according to an embodiment of the present invention. At step 1105, the number (K) of predicate words may be set according to the number of loop iterations necessary for data value recovery. At step 1110, a decision whether rotation operations of register words (i.e., r[i+1]=r[i], i=K−1, . . . , 1) can be performed independently (i.e., without incurring execution overhead) may be made. If the rotation operations may be performed independently, K general registers (i.e., r[1], r[2], . . . , r[K]) may be used as predicate words at step 1115. At step 1120, the rotation operations of K general registers may be set to run independently. At step 1125, a current predicate word for a just executed loop body may be inserted to the first general register (i.e., r[1]). If the decision at step 1110 is that the rotation operations cannot be performed independently, K rotating registers may be used as predicate words at step 1130. At step 1135, a current predicate word for a just executed loop body may be inserted to the first rotating register. At step 1140, a rotating base may be initialized for the K rotating registers and the loop branch may be modified so that hardware circuitry may start automatic rotation operations. At step 1145, the first register used as a predicate word may be initialized with an INVALID STATE to indicate that the first register is not a valid predicate word before entering the loop.

When a loop exists in an optimized region of a program, a method for refining a program flow graph and further augmenting an interference graph of a DAG region of a program as illustrated in FIG. 9 may need to be modified. In a loop region, a loop tail block (the block with the loop branching instruction) should be included in the final refined flow graph.

Referring back to FIG. 4 again, the loop handling mechanism 445 may use rotating predicate words to handle an optimized loop region of a program. The loop handling mechanism extends a precise predicate register allocation method for a DAG region used by the predicate register allocation mechanism 440 to accommodate a loop region to ensure a precise execution path determination for the loop region.

The execution time data recovery mechanism 140 as shown in FIG. 1 comprises two major components: execution path determination mechanism 450 and data value determination mechanism 445 (both components are shown in FIG. 4). The execution path determination mechanism determines an execution path leading to an exception point based on physical predicate registers guarding branching blocks in an optimized region of a program. Based on the determined execution path leading to the exception point, the data value determination mechanism may trace back along the execution path to recover expected values of non-current and non-resident data. In recovering the expected data values, the data value determination mechanism may also utilize optimization annotation information in some circumstances, e.g., an optimization method only moves an instruction within a block.

FIG. 12 is an exemplary illustration of determining an execution path leading to an exception point for data value recovery at execution time, according to an embodiment of the present invention. Assume that an execution path leading to an exception point is to be determined in an optimized region of a program. At step 1205, a lead block for an exception block (where the exception is located) may be set to be a current block (B). The current block may potentially become the first block in the execution path leading to the exception block. At step 1210, a loop condition whether the current block is valid and not the same as the exception block may be checked. If the loop condition has met, a loop body (i.e., steps 1215 to 1260) may be performed. At step 1215, the current block may be added to the execution path leading to the exception block.

At step 1220, the current block may be checked to see if it is a branching block. If the current block is not a branching block, the successor block of the current block in the optimized region may become a new current block at step 1225; and at step 1230, the loop body may be exited, and step 1210 may be executed again to start another loop with the new current block. If the current block is a branching block, the current block may be subsequently checked against the exception block at step 1235. If the current block (a branching block) does not m-reach the exception block, the successor block of the current branching block that reaches the exception block may become a new current block at step 1240, and at step 1245, the loop body may be exited, and step 1210 may be executed again to start another loop with the new current block.

If the current block is a branching block and does m-reach the exception block, the value of the current branching block's guarding predicate register may be checked at step 1250. If the predicate register value equals 1, the current branching block's true successor in the optimized region may become a new current block at step 1255; otherwise, the current branching block's false successor in the optimized region may become a new current block at step 1260. Afterwards, another loop execution may be started again at step 1210 with the new current block. The loop body may be iterated until the loop condition 1210 cannot be met.

Finally, FIG. 13 shows an exemplary illustration of a process in which data values are prepared to be recovered during compilation time and are actually recovered during execution time according to an embodiment of the present invention. Steps 1305 to 1370 are performed at compilation time, and steps 1380 and 1390 are performed at execution time. At step 1305, a loop condition may be checked. The loop condition is for iterative processing of each possible candidate region to be optimized.

At step 1310, optimizations may be applied and measures may be taken to ensure that data values at possible execution points are recoverable based on precise predicate register allocation and optimization annotations. If optimizations result in data values being unrecoverable even with the precise register allocation and optimization annotations, the optimizations will not be applied. At step 1320, a flow graph for the optimized region may be generated. The flow graph may comprise rough code blocks and relationships between these blocks. At step 1330, exception points, lead blocks corresponding to each exception blocks, and branching blocks may be identified for the optimized candidate region. The optimized region may be trimmed based on the identified exception points and their corresponding lead blocks before the branching blocks are identified. At step 1340, the flow graph for the optimized region may be refined based on the identified exception points, lead blocks, and branching blocks. The refined flow graph only comprises blocks that are necessary for data value recovery at the identified exception points. The refining process may be performed at later stages as well. At step 1350 m-reach relationships (i.e., reach, m-reach, and em-reach sets) between blocks in the refined flow graph may be computed.

At step 1360, precise predicate register allocation may be performed in a DAG region. If a region contains loops, the region may be divided into separate sub-regions, with each sub-region having only one loop whose body is a DAG region. At step 470, special processing may be performed to handle a loop region. The special processing may comprise inserting predicate words' save and rotation instructions so that predicate register values for a number of loop body iterations may be saved and used later for data value recovery. At execution time, an execution path leading to an exception point may be determined at step 1380 based on values of the predicate registers precisely allocated during the compilation time. At step 1390, values of non-current and non-resident data may be recovered using the determined execution path as well as optimization annotations.

Although an example embodiment of the present invention is described with reference to block and flow diagrams as well as pseudo codes in FIGS. 1-13, persons of ordinary skill in the art will readily appreciate that many other methods of implementing the present invention may alternatively be used. For example, the order of execution of the blocks in flow diagrams or steps in pseudo codes may be changed, and/or some of the blocks in block/flow diagrams and the steps in pseudo codes described may be changed, eliminated, or combined.

In the preceding description, various aspects of the present invention have been described. For purposes of explanation, specific numbers, systems and configurations were set forth in order to provide a thorough understanding of the present invention. However, it is apparent to one skilled in the art having the benefit of this disclosure that the present invention may be practiced without the specific details. In other instances, well-known features, components, or modules were omitted, simplified, combined, or split in order not to obscure the present invention.

Embodiments of the present invention may be implemented on any computing platform, which comprises hardware and operating systems.

If embodiments of the present invention are implemented in software, the software may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method for recovering data values in an optimized program during execution, comprising:
    receiving a program;
    identifying a region of the program for optimizations, the region of the program including at least one code block;
    applying the optimizations to the region;
    analyzing the optimized region for precisely allocating predicate registers to the at least one code block; and
    performing the precise predicate register allocation, values stored in the allocated predicate registers being used for recovering the data values during execution of the program;
    wherein performing the precise predicate register allocation including:
        computing m-reach relationships between blocks in the optimized region;
        augmenting an initial interference graph based on the computed m-reach relationships between blocks; and
        mapping physical predicate registers to virtual predicate registers for branching blocks in the optimized region based on the augmented interference graph.

2. The method of claim 1, wherein applying the optimizations comprises annotating the optimizations.

3. The method of claim 2, further comprising:
    determining an execution path in the optimized region based on the values stored in the predicate registers during the execution of the program; and
    recovering the data values based on the determined execution path and the optimization annotations at execution time.

4. The method of claim 1, wherein analyzing the optimized region comprises:
    generating an initial flow graph for the optimized region;
    identifying recovery points and lead blocks;
    refining the initial flow graph based on the identified recovery points and lead blocks; and
    identify branching blocks for the refined optimized region.

5. The method of claim 4, wherein a recovery point comprises at least a point where data value recovery is required, a lead block comprises a dominant block for data value recovery at the recovery point, and a branching block comprises a block that has more than one successor block inside the optimized region.

6. The method of claim 1, wherein performing the precise predicate register allocation comprises:
    assigning virtual predicate registers to blocks in a refined flow graph of the optimized region; and
    generating an initial interference graph for the virtual predicate registers.

7. The method of claim 6, further comprising using predicate words to save values of the physical predicate registers to handle a loop in the optimized region.

8. The method of claim 1, wherein the m-reach relationships comprise sets of blocks that a block reaches, m-reaches, and em-reaches.

9. A processor having a dynamic runtime system, which, when executed by the processor, recovers data values in an optimized program during execution, the dynamic runtime system comprising:
    an optimization mechanism to receive a program and to apply optimizations to the program;
    an optimization time data recovery mechanism to enable data value recovery at execution time by precisely allocating predicate registers to blocks in the optimized program; precisely allocating predicate registers including:
        computing m-reach relationships between blocks in the optimized region;
        augmenting an initial interference graph based on the computed m-reach relationships between blocks; and
        mapping physical predicate registers to virtual predicate registers for branching blocks in the optimized region based on the augmented interference graph; and
    an execution time data recovery mechanism to recover data values during execution of the optimized program based on values stored in the allocated predicate registers.

10. The processor of claim 9, wherein the optimization mechanism comprises an annotation component to annotate the applied optimizations.

11. The processor of claim 9, wherein the optimization time data recovery mechanism comprises a predicate register allocation mechanism to precisely allocate the predicate registers to branching blocks in the optimized program during compilation of the program.

12. The processor of claim 9, wherein the execution time data recovery mechanism comprises: an execution path determination mechanism to determine an execution path in the optimized region based on the values stored in the predicate registers for the branching blocks during the execution of the optimized program.

13. A computing system, comprising:
    a processor; and
    a memory coupled to the processor, the memory having a dynamic runtime system, which, when executed by the processor, recovers data values in an optimized program during execution, the dynamic runtime system including:
        a plurality of compilation time data recovery components to provide information to enable data value recovery at execution time, and
    a plurality of execution time data recovery components to precisely allocate predicate registers to blocks in the optimized program based on the information provided by the plurality of compilation time data recovery components, and to recover the data values based on values stored in the allocated predicate registers during execution of the optimized program;
    wherein precisely allocating predicate register including:
        computing m-reach relationships between blocks in the optimized region;
        augmenting an initial interference graph based on the computed m-reach relationships between blocks; and
        mapping physical predicate registers to virtual predicate registers for branching blocks in the optimized region based on the augmented interference graph.

14. The system of claim 13, wherein the plurality of compilation time data recovery components comprises:
    a flow graph generator to receive a program and generate an initial flow graph for an optimized region of the program;
    a recovery point and lead block identifier to identify points where data value recovery is needed, lead blocks that dominate other blocks for data value recovery at recovery points, and branching blocks, based on the initial flow graph; and a predicate register allocation mechanism to perform precise predicate register allocation for the optimized region of the program.

15. The system of claim 13, wherein the plurality of execution time data recovery components comprises:

an execution path determination mechanism to determine an execution path based on the values stored in the precisely allocated predicate registers during execution of the optimized program; and a data value determination mechanism to recover the data values based at least on the determined execution path.

16. The system of claim 14, wherein the dynamic runtime system further comprises:

a flow graph refining mechanism to produce a refined flow graph based on the initial flow graph of the optimized region, according to the identified recovery points and lead blocks;

a branching block identifier to identify branching blocks for the optimized region of the program; and a reachability configuration mechanism to compute m-reach relationships between blocks in the refined flow graph.

17. The system of claim 16, wherein the dynamic runtime system further comprises:

an interference graph generating and augmenting mechanism to produce an augmented interference graph for virtual predicate registers guarding branching blocks based on the m-reach relationships between blocks in the refined flow graph of the optimized region of the program;

a predicate register allocation mechanism to map physical predicate registers to the virtual predicate registers for branching blocks, based on the augmented interference graph; and a loop handling mechanism to use predicate words to record values of the physical predicate register values to ensure precise execution path determination at execution time if a loop exists in the optimized region.

18. The system of claim 17, wherein the interference graph generating and augmenting mechanism comprises:

an initial interference graph generation component to generate an initial interference graph for the virtual predicate registers guarding branching blocks in the refined flow graph of the optimized region; and an interference graph modification component to modify the initial interference graph based on the m-reach relationships.

19. An article comprising: a machine accessible medium having content stored thereon, wherein when the content is accessed by a processor, the content provides for recovering data values in an optimized program during execution by:

receiving a program;

identifying a region of the program for optimizations, the region of the program including at least one code block;

applying the optimizations to the region;

analyzing the optimized region for precisely allocating predicate registers to the at least one code block; and performing the precise predicate register allocation, values stored in the allocated predicate registers being used for recovering the data values during execution of the program;

wherein performing the precise predicate register allocation including:

computing m-reach relationships between blocks in the optimized region;

augmenting an initial interference graph based on the computed m-reach relationships between blocks; and mapping physical predicate registers to virtual predicate registers for branching blocks in the optimized region based on the augmented interference graph.

20. The article of claim 19, wherein content for applying the optimizations comprises content for annotating the optimizations.

21. The article of claim 20, further comprising content for:

determining an execution path in the optimized region based on the values stored in the predicate registers during the execution of the program; and recovering the data values based on the determined execution path and the optimization annotations at execution time.

22. The article of claim 19, wherein content for analyzing the optimized region comprises content for:

generating an initial flow graph for the optimized region;

identifying recovery points and lead blocks;

refining the initial flow graph based on the identified recovery points and lead blocks; and identify branching blocks for the refined optimized region.

23. The article of claim 22, wherein a recovery point comprises at least a point where data value recovery is required, a lead block comprises a dominant block for data value recovery at the recovery point, and a branching block comprises a block that has more than one successor block inside the optimized region.

24. The article of claim 19, wherein content for performing the precise predicate register allocation comprises content for:

assigning virtual predicate registers to blocks in a refined flow graph of the optimized region; and generating an initial interference graph for the virtual predicate registers.

25. The article of claim 24, further comprising content for using predicate words to save values of the physical predicate registers to handle a loop in the optimized region.

26. The article of claim 19, wherein the m-reach relationships comprise sets of blocks that a block reaches, m-reaches, and em-reaches.

* * * * *